(12) United States Patent
Wang

(10) Patent No.: US 7,465,392 B1
(45) Date of Patent: Dec. 16, 2008

(54) WEEDER FOR POND

(75) Inventor: Yu-Chin Wang, Taipei (TW)

(73) Assignee: EIKO Electric Products Corp., Taipei (TW)

( * ) Notice: Subject to any disclaimer, the term of this patent is extended or adjusted under 35 U.S.C. 154(b) by 0 days.

(21) Appl. No.: 11/832,668

(22) Filed: Aug. 2, 2007

(51) Int. Cl.
*A01D 44/00* (2006.01)

(52) U.S. Cl. ............... 210/170.09; 210/173; 210/416.1; 15/1.7; 56/9; 241/46.11; 241/46.17

(58) Field of Classification Search ............ 210/167.16, 210/170.02, 170.04, 170.09, 173, 416.1, 210/416.2; 15/1.7; 56/8, 9; 241/46.01, 46.11, 241/46.17, 185.6; 47/59 R
See application file for complete search history.

(56) References Cited

U.S. PATENT DOCUMENTS

| | | | | |
|---|---|---|---|---|
| 1,571,395 A * | 2/1926 | Clark | ............................... | 56/9 |
| 2,629,218 A * | 2/1953 | Smith | ............................... | 56/9 |
| 3,225,930 A * | 12/1965 | Willinger | .................. | 210/416.2 |
| 3,546,858 A * | 12/1970 | Chaplin | ............................ | 56/9 |
| 3,808,779 A * | 5/1974 | Randall | ............................ | 56/9 |
| 4,261,160 A * | 4/1981 | Niewiera | ......................... | 56/9 |
| 4,555,063 A * | 11/1985 | Goettsch | ................... | 241/46.17 |
| 5,197,263 A * | 3/1993 | Midtling et al. | .................... | 56/8 |
| 7,022,223 B2 * | 4/2006 | Lovestead et al. | ............ | 210/173 |
| 7,178,188 B1 * | 2/2007 | Jaakola | .......................... | 15/1.7 |
| 2003/0101523 A1 * | 6/2003 | Lepley, Jr. | ..................... | 15/1.7 |
| 2006/0032204 A1 * | 2/2006 | Feinaugle | ......................... | 56/8 |

* cited by examiner

*Primary Examiner*—Christopher Upton
(74) *Attorney, Agent, or Firm*—Ming Chow; Sinorica, LLC

(57) ABSTRACT

A weeder for a pond, it mainly has a handle unit provided on one end of a long pipe, and has thereon a switch and a set of power source equipment; the other end the long pipe is provided sequentially with an electric device, a knife/blade device and a sucking mouth piece unit. The electric device is provided with a motor to make rotation of the blade and the knife, thereby a sucking mouth piece of the sucking mouth piece unit can suck in weeds or dirt in water of the pond, the matter sucked in is minced by the rotating knife and then is removed by exhausting outwards.

9 Claims, 5 Drawing Sheets

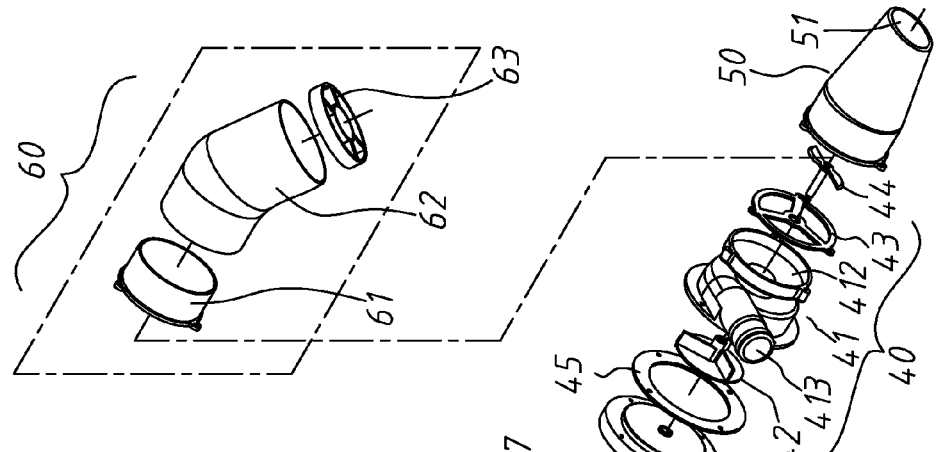
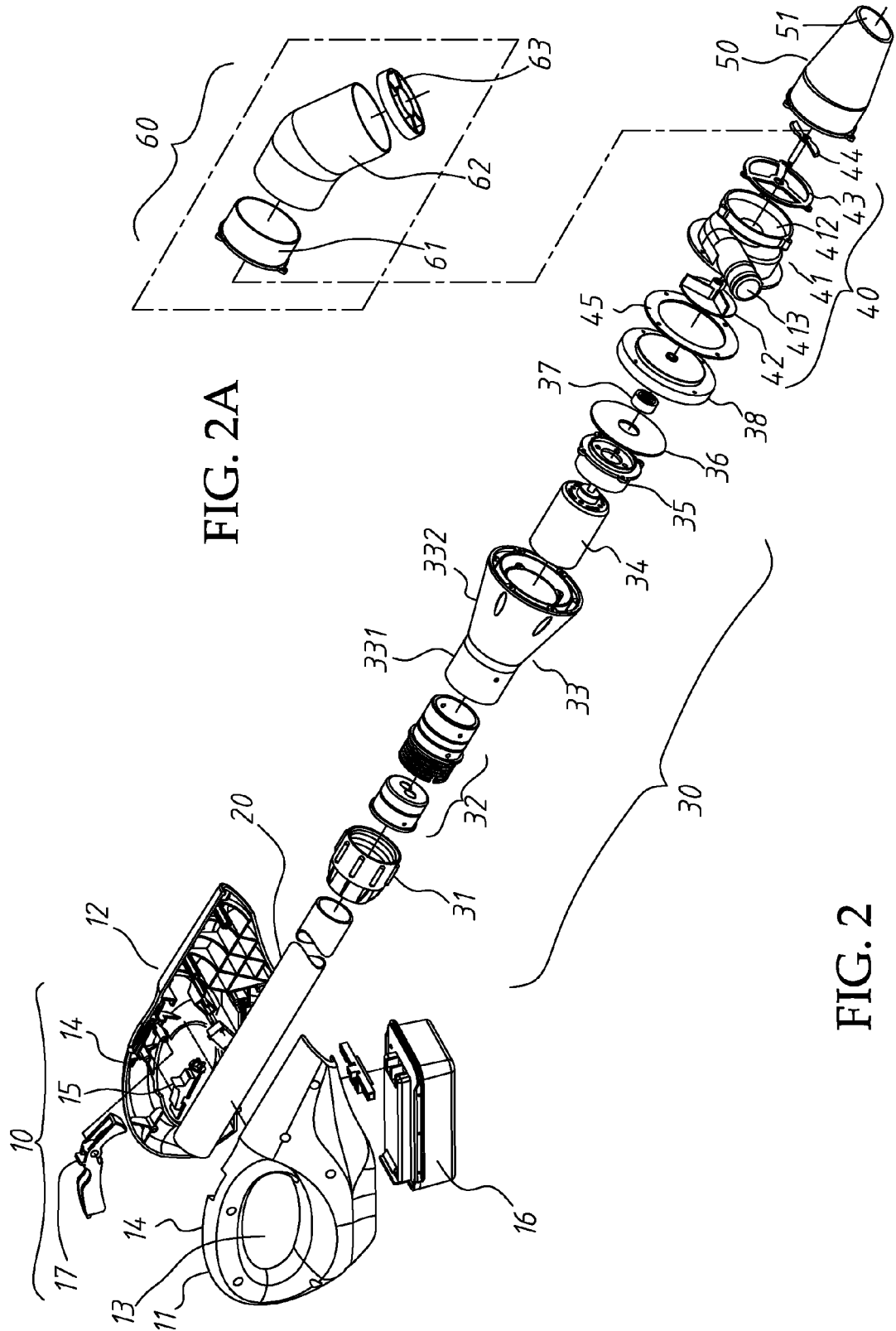
FIG. 2A
FIG. 2

WEEDER FOR POND

BACKGROUND OF THE INVENTION

1. Field of the Invention

The present invention relates to a weeder for a pond, and especially to a weeder for removing by sucking weeds or dirt in water of a pond, pool etc.

2. Description of the Prior Art

In or on the water surface of a pond or pool stored with large amount of water, weeds, floating matters or dirt etc. may exist and need to be removed. Conventional removing equipment has a long pipe with a suction mouth piece on its one end, the other end of the pipe is connected to a pump, by means of the vacuum pumping action, suction force is generated in the long pipe; the removed matters in the water is absorbed into the long pipe and sent to a filtering tank, the water is then separated from the removed matters, thereby a function of clearing the water is achieved.

Although such a set of conventional removing equipment can get the object of clearing, by the fact that sizes of the removed matters sucked in are various; when the matters pass the filtering tank, the latter suffers a very large burden, and is subjected to being blocked, thereby improvement is wanted.

SUMMARY OF THE INVENTION

The main object of the present invention is to provide a weeder for a pond, the weeder has in addition to blades for generating suction force, a knife for mincing the cleared and sucked matter to shreds which then are sent to a filtering tank. Thereby the burden of the filtering tank is largely reduced, and no problem of blocking will occur.

Another object of the present invention is to provide a weeder for a pond, the weeder is suitable to be handled with hands, the handle of the weeder is provided with a switch controlled by a safety device to prevent inadvertent activating.

Another object of the present invention is to provide a weeder for a pond, the weeder is provided on its sucking mouth piece with a guarding hood to prevent a kid from the danger of extending a hand into the sucking mouth piece.

A further object of the present invention is to provide a weeder for a pond, in which an electric conductive part of an electric device in the weeder is safely enclosed.

A further object of the present invention is to provide a weeder for a pond in which a set of power source equipment can be a chargeable battery, in order to safely provide DC electric power.

The present invention will be apparent in its structure and function of operation after reading the detailed description of the preferred embodiment thereof in reference to the accompanying drawings.

BRIEF DESCRIPTION OF THE DRAWINGS

FIG. 2 is an anatomic perspective view of the present invention;

FIG. 2A is an anatomic perspective view of a sucking mouth piece unit of the present invention;

DETAILED DESCRIPTION OF THE PREFERRED EMBODIMENT

Figure 1:
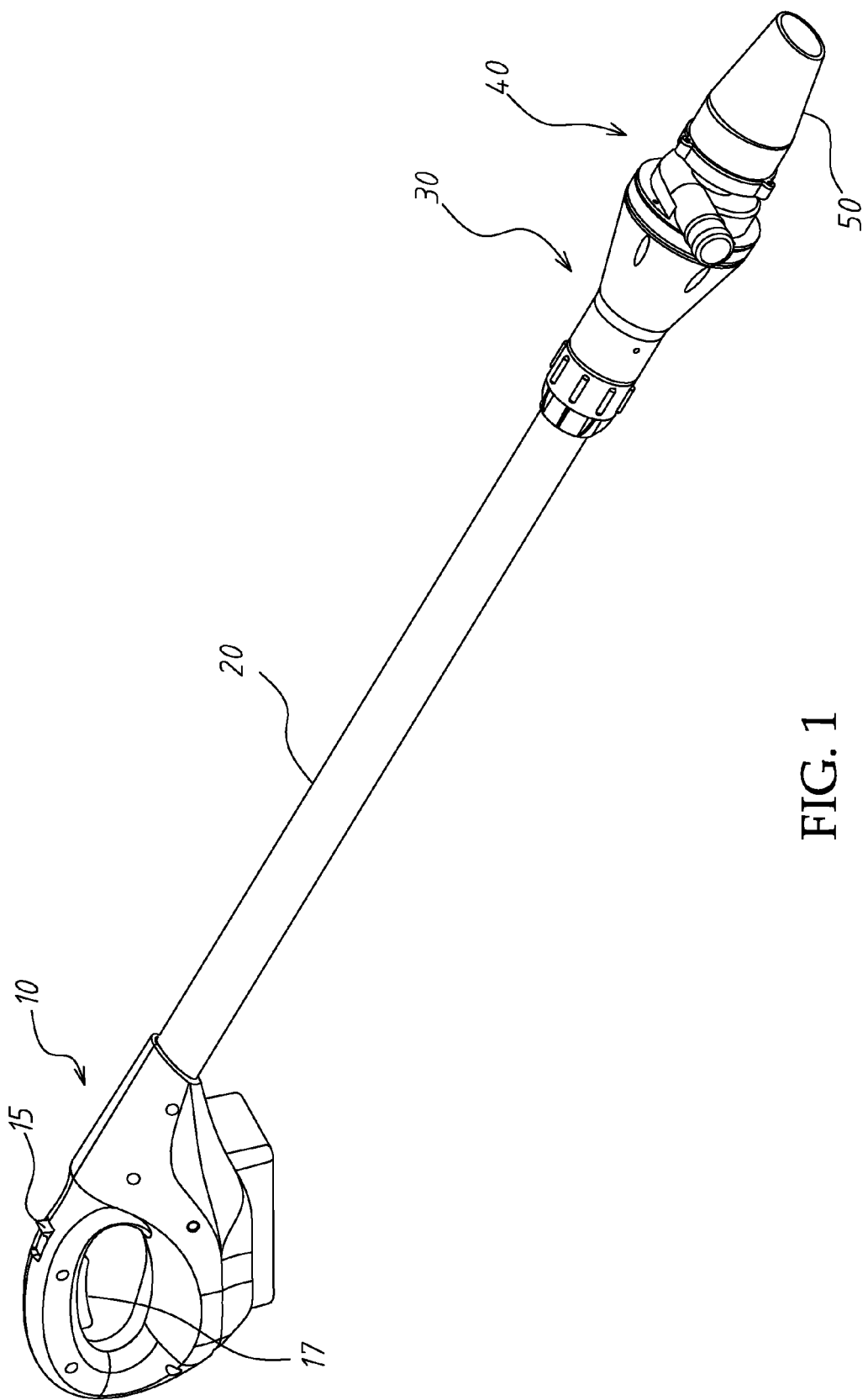
FIG. 1 is a perspective view showing the appearance of the present invention.
Figure 3:
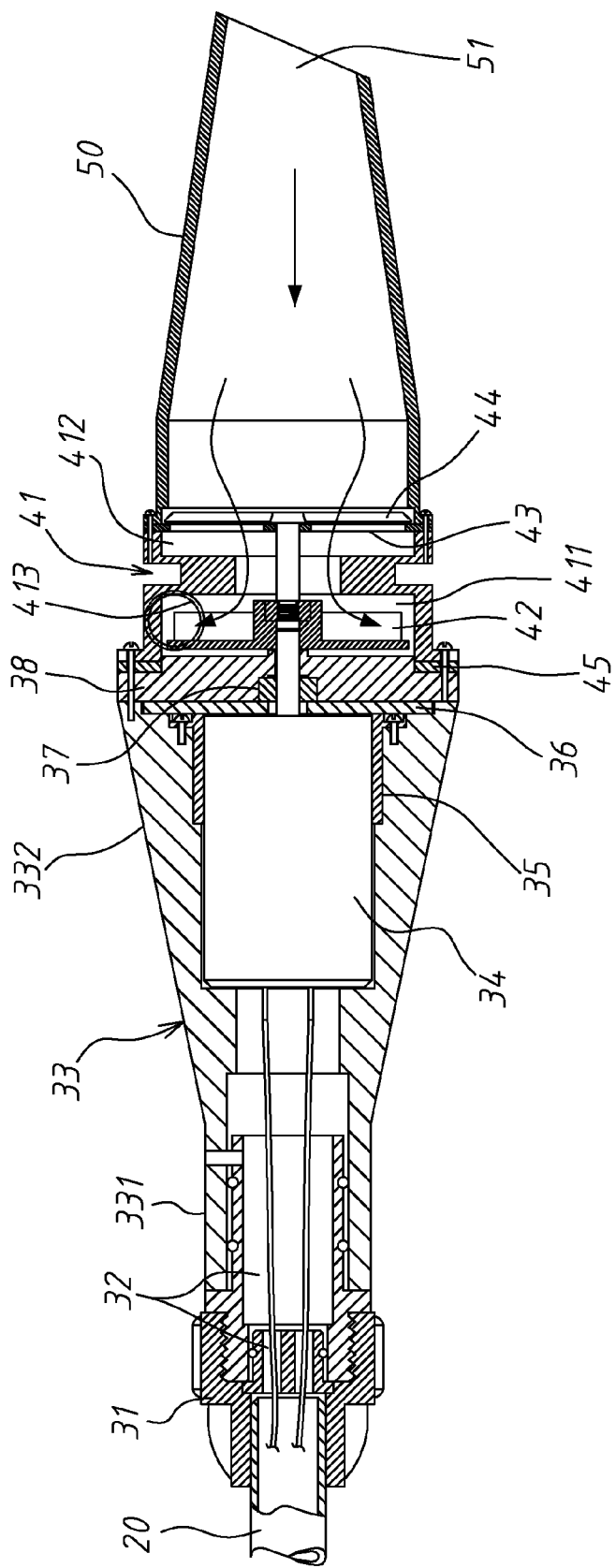
FIG. 3 is a sectional view of a part of the present invention.

Referring to FIGS. 1-3, the weeder for a pond of the present invention is used to remove by sucking weeds or dirt in water of the pond, and is composed mainly of a handle unit 10, a long pipe 20, an electric device 30, a knife/blade device 40 and a sucking mouth piece unit 50.

The handle unit 10 is composed of a right cover part 11 and a left cover part 12 symmetrical to each other, and has an elongate hole 13 in the front end of it to receive thereon a grasp 14. The grasp 14 is for grasping of a hand, and is provided thereon with a switch 15 suiting manipulation of a finger; for instance, a slide switch 15 is depicted in the drawings used to control a set of power source equipment 16 provided detachably on a lower edge of the right cover part 11 and the left cover part 12. The switch 15 is provided above an upper edge of the grasp 14 in favor of manipulation of the finger. A safety device 17 is provided on an upper edge of the elongate hole 13; the switch 15 can only be operated when the safety device 17 has been operated. The power source equipment 16 is a chargeable battery that can safely provide D.C. electric power.

The front end of the long pipe 20 is clamped and connected by the right cover part 11 and the left cover part 12 of the handle unit 10, and is extended outwardly.

The electric device 30 is provided on the rear end of the long pipe 20, a pipe locking sleeve 31 is provided at the joint of the long pipe 20 with the electric device 30, the pipe locking sleeve 31 is screw connected with an electric power adapter 32 which is extended into a housing 33 for electrically connecting with a motor 34. The motor 34 is controlled for operation by the switch 15. The housing 33 is in the shape of a horn, and has a cylindrical portion 331 and a conical portion 332; the cylindrical portion 331 is slipped over the electric power adapter 32, while the conical portion 332 receives therein the motor 34. An opening of the conical portion 332 of the housing 33 is provided therein with an electric rack 35, a sealing pad 36, an oil seal 37 and a lid 38 for covering the opening of the conical portion 332, a rotation axle of the motor 34 is extended through these elements into the knife/blade device 40; such a structure renders the electrically conductive parts in the electric device 30 installed in a waterproof mode.

The knife/blade device 40 is connected with the electric device 30 by means of a knife/blade housing 41. The knife/blade housing 41 has a front chamber 411 and a rear chamber 412 in communication with each other, the front chamber 411 is provided therein with a blade 42 and has an exhaust channel 413 to connect with a filtering tank 72 by means of a pipe line 71 extending out of its side wall (please refer to FIG. 4). The rear chamber 412 is provided therein with a rack 43 for a knife 44. The blade 42 and the knife 44 both are linked with the motor 34 and thus are rotated. And the knife/blade housing 41 of the knife/blade device 40 is connected with the conical portion 332 of the housing 33 by means of an annular sealing pad 45.

The sucking mouth piece unit 50 is communicated with the rear chamber 412 of the knife/blade housing 41 of the knife/blade device 40 to cover the knife 44, as shown in FIGS. 1-3, the sucking mouth piece unit 50 is a pipe like hood tapered at its rear end which forms on its tailing end a sucking mouth piece 51.

Further, in another embodiment of sucking mouth piece unit 60 as shown in FIG. 2A, a fixing sleeve 61 is connected with the front chamber 411 of the knife/blade housing 41, the fixing sleeve 61 is slipped in an end of a bended pipe 62, the other end of the bended pipe 62 is slipped over a guarding lid 63 with a check-like surface. Such design is to prevent the danger of extending in of fingers of a child.

Figure 4:
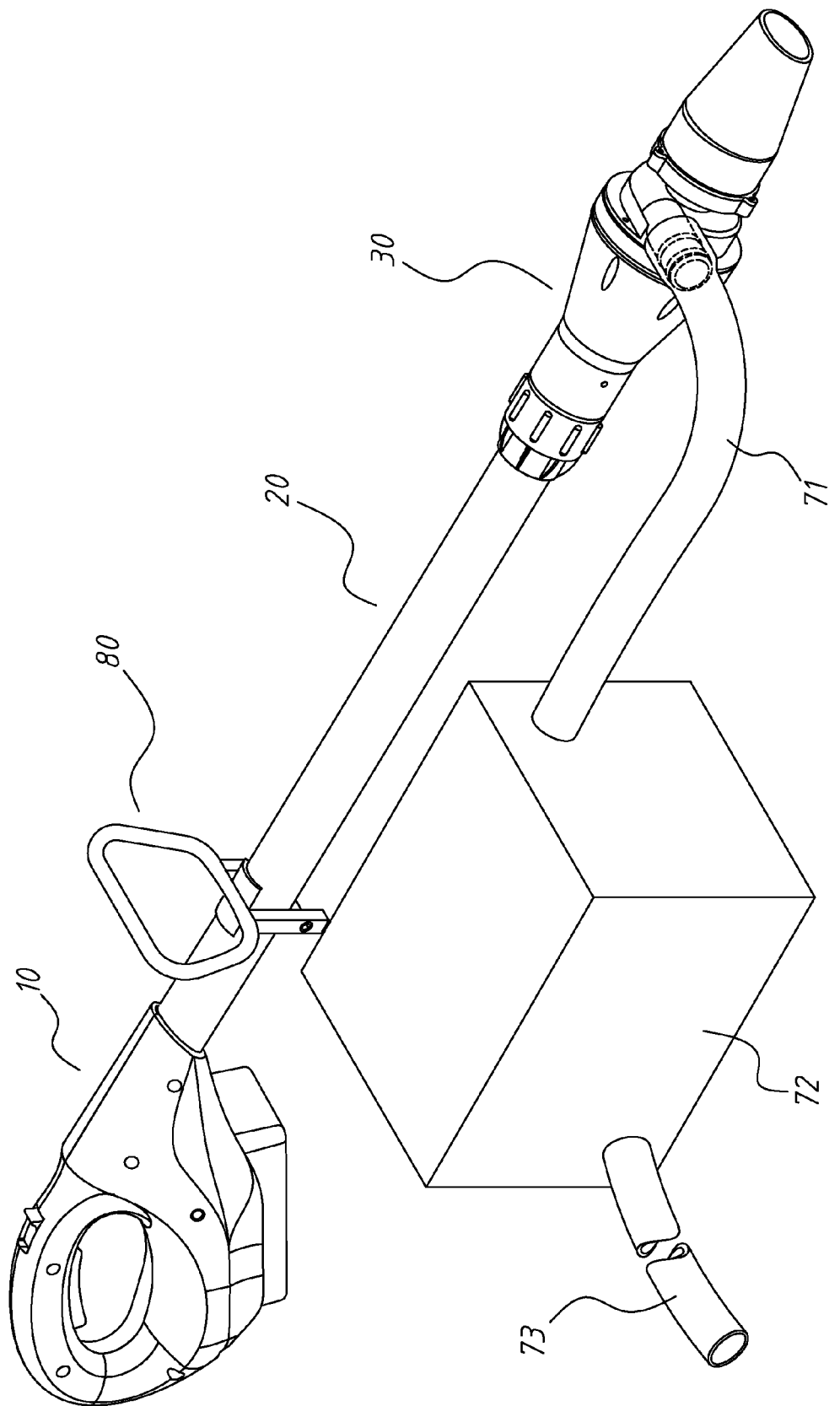
FIG. 4 is a perspective schematic view showing connecting of the present invention to a filtering tank.

Referring to FIG. 4, the weeder for a pond of the present invention can be connected with the pipe line 71 at the exhaust channel 413, the other end of the pipe line 71 is connected with the filtering tank 72, and an exhaust pipe 73 of the filtering tank 72 makes flowing of the water filtered back to the pond. The long pipe 20 preferably is mounted with a handle loop 80.

Figure 5:
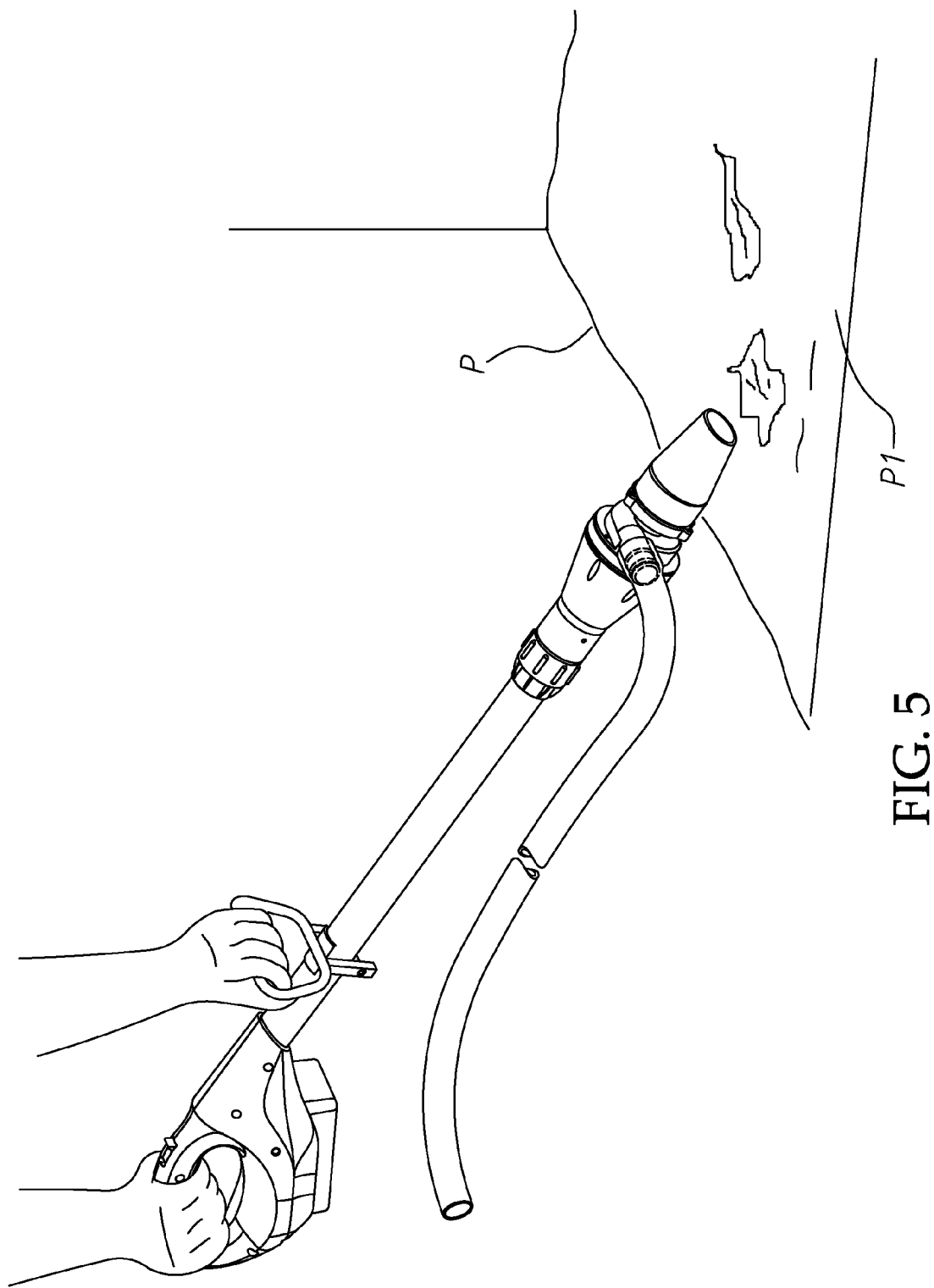
FIG. 5 is a perspective schematic view showing use of the present invention.

As shown in FIG. 5, when in using the present invention, a user can use his two hands to hold respectively the grasp 14 and the handle loop 80. Four fingers other than the thumb can be used to press the safety device 17, while the thumb can be used to trigger the switch 15, so that the motor 34 in the electric device 30 is activated to make rotation of the blade 42 and the knife 44. And referring to FIG. 3, as shown by the arrows, rotation of the blade 42 renders the sucking mouth piece 51 of the sucking mouth piece unit 50 to generate sucking force to suck in weeds or dirt P1 in the water of the pond P; the matter sucked in is minced by the rotating knife 44, and is sent to the filtering tank 72 through the exhaust channel 413, the water filtered can directly flow back to the pond P.

By virtue that the present invention is installed therein with the knife 44 which can mince the sucked in weeds, leaves, branches or dirt, thereby a burden on the filtering tank 72 can be largely reduced; and water filtered through the filtering tank 72 can directly flow back to the pond P.

While preferred embodiments of the present invention has been known and described hereinabove, it is apparent that various changes and modifications might be made without departing from the scope of the invention which is set forth in the accompanying claims.

The invention claimed is:

1. A weeder for a pond being used to remove weeds or dirt in water of said pond and comprising:
   a handle unit having a grasp for grasping of a hand and being provided thereon with a switch suiting manipulation of a finger used to control a set of power source equipment provided detachably on said grasp;
   a long pipe having an end in connecting with said grasp;
   an electric device provided on other end of said long pipe, and being provided with a housing having therein at least a motor, said motor being controlled by said switch;
   a knife/blade device connected with said electric device by means of a knife/blade housing, said knife/blade housing having a front chamber and a rear chamber in communication with each other; said front chamber being provided therein with a blade and having an exhaust channel to connect with a filtering tank by means of a pipe line extending out of its side wall; said rear chamber being provided therein with a rack for a knife; said blade and said knife both being linked with said motor and thus being rotated; and
   a sucking mouth piece unit communicated with said rear chamber of said knife/blade housing of said knife/blade device to cover said knife, and further having at least a sucking mouth piece;
   when said switch being turned on, said blade and said knife both being rotated; rotation of said blade renders said sucking mouth piece of said sucking mouth piece unit to generate sucking force to suck in weeds or dirt in water of said pond; said weeds or dirt sucked in being minced by said rotating knife, and is sent to said filtering tank through said exhaust channel.

2. The weeder for a pond as claimed in claim 1, wherein said handle unit has a right cover part and a left cover part symmetrical to each other, and has an elongate hole in a front end of it to receive thereon said grasp; said switch is provided above an upper edge of said grasp; said power source equipment is provided on a lower edge of said right cover part and said left cover part.

3. The weeder for a pond as claimed in claim 2, wherein a safety device is provided on an upper edge of said elongate hole;
   said switch is operated only when said safety device has been operated.

4. The weeder for a pond as claimed in claim 1, wherein a pipe locking sleeve is provided at a joint of said long pipe with said electric device, said pipe locking sleeve is screw connected with an electric power adapter which is extended into a housing for electrically connecting with said motor.

5. The weeder for a pond as claimed in claim 4, wherein said housing is in a shape of horn; and has a cylindrical portion slipped over said electric power adapter, and has a conical portion receiving therein said motor.

6. The weeder for a pond as claimed in claim 5, wherein an opening of said conical portion of said housing is provided therein with an electric rack, a sealing pad, an oil seal and a lid for covering said opening of said conical portion, a rotation axle of said motor is extended through above mentioned elements provided in said opening into said knife/blade device to link with said blade and said knife.

7. The weeder for a pond as claimed in claim 6, wherein said knife/blade housing of said knife/blade device is connected with said conical portion of said housing by means of an annular sealing pad.

8. The weeder for a pond as claimed in claim 1, wherein said sucking mouth piece unit is a pipe like hood tapered at its rear end.

9. The weeder for a pond as claimed in claim 1, wherein said sucking mouth piece unit has a fixing sleeve connected with said front chamber of said knife/blade housing; said fixing sleeve is slipped in an end of a bended pipe, other end of said bended pipe is slipped over a guarding lid with a check-like surface.

\* \* \* \* \*